US012779477B2

(12) United States Patent
Al-Jamal et al.

(10) Patent No.: US 12,779,477 B2
(45) Date of Patent: Nov. 3, 2026

(54) SAND SEPARATION SYSTEM WITH CONTINUOUS SIPHONED SAND DISPOSAL

(71) Applicants: Helmi Al-Jamal, Richmond, TX (US); Francois Martin, Cypress, TX (US)

(72) Inventors: Helmi Al-Jamal, Richmond, TX (US); Francois Martin, Cypress, TX (US)

( * ) Notice: Subject to any disclaimer, the term of this patent is extended or adjusted under 35 U.S.C. 154(b) by 0 days.

(21) Appl. No.: 19/236,064

(22) Filed: Jun. 12, 2025

(65) Prior Publication Data

US 2026/0201787 A1 Jul. 16, 2026

Related U.S. Application Data

(60) Provisional application No. 63/744,171, filed on Jan. 10, 2025.

(51) Int. Cl.

| | |
|---|---|
| ***E21B 43/34*** | (2006.01) |
| ***B01D 21/24*** | (2006.01) |
| ***B01D 21/26*** | (2006.01) |
| ***B04C 5/12*** | (2006.01) |
| ***B04C 5/14*** | (2006.01) |
| ***B04C 5/26*** | (2006.01) |
| ***B04C 5/30*** | (2006.01) |
| ***E21B 41/00*** | (2006.01) |

(52) U.S. Cl.
CPC ............ *B04C 5/30* (2013.01); *B01D 21/2411* (2013.01); *B01D 21/245* (2013.01); *B01D 21/267* (2013.01); *B04C 5/12* (2013.01); *B04C 5/14* (2013.01); *B04C 5/26* (2013.01); *E21B 41/005* (2013.01); *E21B 43/35* (2020.05)

(58) Field of Classification Search
CPC ........ E21B 43/35; E21B 43/34; E21B 41/005; B01D 21/245; B01D 21/2411
See application file for complete search history.

(56) References Cited

U.S. PATENT DOCUMENTS

| | | | | | |
|---|---|---|---|---|---|
| 689,166 | A * | 12/1901 | Coleman | B03B 5/623 209/55 |
| 1,570,523 | A * | 1/1926 | Pennell | B01D 35/12 210/291 |
| 2,301,371 | A * | 11/1942 | Corwin | B01D 21/0012 210/512.1 |
| 2,748,884 | A * | 6/1956 | Erwin | E21B 21/067 96/198 |

(Continued)

OTHER PUBLICATIONS wikipedia.org; Trap (plumbing); https://en.wikipedia.org/wiki/Trap_(plumbing).

*Primary Examiner* — Shane Bomar

(57) ABSTRACT

A sand separation system for continuous sand disposal is disclosed. It includes a sand catching vessel to receive a multi-phase fluid stream (e.g., oil and gas production) containing settleable solids such as sand. A siphoning conduit connected to the vessel's lower end facilitates for continuous sand disposal. Continuous sand disposal is an operational improvement over conventional batch sand disposal systems. The separation system may feature a control valve on the siphon conduit to regulate sand flow and a water inlet to inject water into the sand collecting vessel. This continuous sand disposal design improves operational efficiency by avoiding separator downtime caused by batch removal of accumulated sand.

10 Claims, 5 Drawing Sheets

(56) References Cited

U.S. PATENT DOCUMENTS

| | | | | |
|---|---|---|---|---|
| 4,428,841 | A * | 1/1984 | Favret, Jr. | B01D 17/0211 210/522 |
| 2016/0375386 | A1 * | 12/2016 | Magnus | B01D 45/08 95/267 |
| 2017/0182435 | A1 * | 6/2017 | Morris | B01D 29/356 |
| 2022/0154568 | A1 * | 5/2022 | Fink | B01D 21/2411 |
| 2023/0338967 | A1 * | 10/2023 | Richmond | B03B 5/623 |

* cited by examiner

SAND SEPARATION SYSTEM WITH CONTINUOUS SIPHONED SAND DISPOSAL

CROSS-REFERENCE TO RELATED APPLICATIONS

This application claims benefit of priority from U.S. Provisional Application Ser. No. 63/744,171, filed Jan. 10, 2025, the entire contents of which are hereby incorporated by reference.

BACKGROUND

Field of the Invention

This disclosure relates to sand separators; more particularly, to sand separators capable of continuous sand disposal.

Description of the Related Art

Oil and gas are produced from underground reservoirs after drilling a hole in the ground whether on land or at the bottom of ocean. The produced oil and/or gas contain various constituent materials including sand particles. These sand particles need to be filtered out from the produced stream prior it is sent to further processing or to customers because the presence of sand particles damages downstream equipment if not filtered out. Desanders are commonly used equipment in the Oil and Gas industry to filter out these sand particles using cyclonic separators. The collected sand from these separators is conventionally removed by stopping inflow to the separator, opening a sand outlet to remove the sand, closing the sand outlet, and restarting inflow to the separator. This technique is referred to as "batch sand disposal" herein. Batch sand disposal may cause facility downtime, or it may necessitate redundancy such that one or more parallel separators can remain online while a separator is stopped for the batch sand disposal procedure described above.

As opposed to batch sand disposal, a separator configured to allow continuous sand disposal would facilitate sand disposal from the separator while the separator remains in service. If the disposal port of a conventional sand separator was left open, the sand disposal stream exiting through the disposal port will have unacceptably high levels of oil and/or gas, which is considered a safety hazard. For that reason, operators typically operate separators with the disposal port closed, thereby causing the separator to operate intermittently due to batch sand disposal.

A sand separator capable of continuous sand disposal could reduce operational interruptions for sand disposal, reduce the number of separators required, and reduce the footprint of the sand separation system. Therefore, there is an industry need for a sand separation system which facilitates continuous sand disposal.

SUMMARY

The disclosure concerns a sand separation system with continuous sand disposal, also called the "separation system," herein. The separation system comprises a sand catching vessel and a siphoning conduit. The separation system receives a sand stream which may contain oil, water, gas, particulate matter, or some combination thereof. The constituents of the incoming sand stream tend to separate within the sand catching vessel due to gravitational forces.

The sand stream enters the sand catching vessel, and the dense particulate matter, called "sand" herein, tends to collect towards the bottom of the sand catching vessel. The collected sand may still have small amounts of oil, water or gas entrained with the sand. However, because oil, water, gas and any other constituents besides the sand are less dense than sand, those constituents collect above the sand.

The sand catching vessel has a siphon conduit disposed towards the lower end of the sand catching vessel to remove the collected sand. The geometry of the siphon conduit allows for continuous sand disposal from the sand catching vessel.

In some embodiments, the separation system further comprises a control valve disposed on the siphon conduit. The control valve allows the operators of the separation system to control the flowrate of the disposal stream through the siphon conduit.

In some embodiments, the separation system further comprises a water inlet. A water stream may be injected into the sand collecting vessel through the water inlet to improve sand disposal. The water stream may fluidize the collected sand or break up the collected sand such that the collected sand may be more readily conveyed out of the sand collecting vessel.

BRIEF DESCRIPTION OF THE DRAWINGS

Other features, combinations, and embodiments will be appreciated by one having the ordinary level of skill in the art of cyclonic separation systems and accessories upon a thorough review of the following details and descriptions, particularly when reviewed in conjunction with the drawings, wherein.

DETAILED DESCRIPTION

Figure 1:
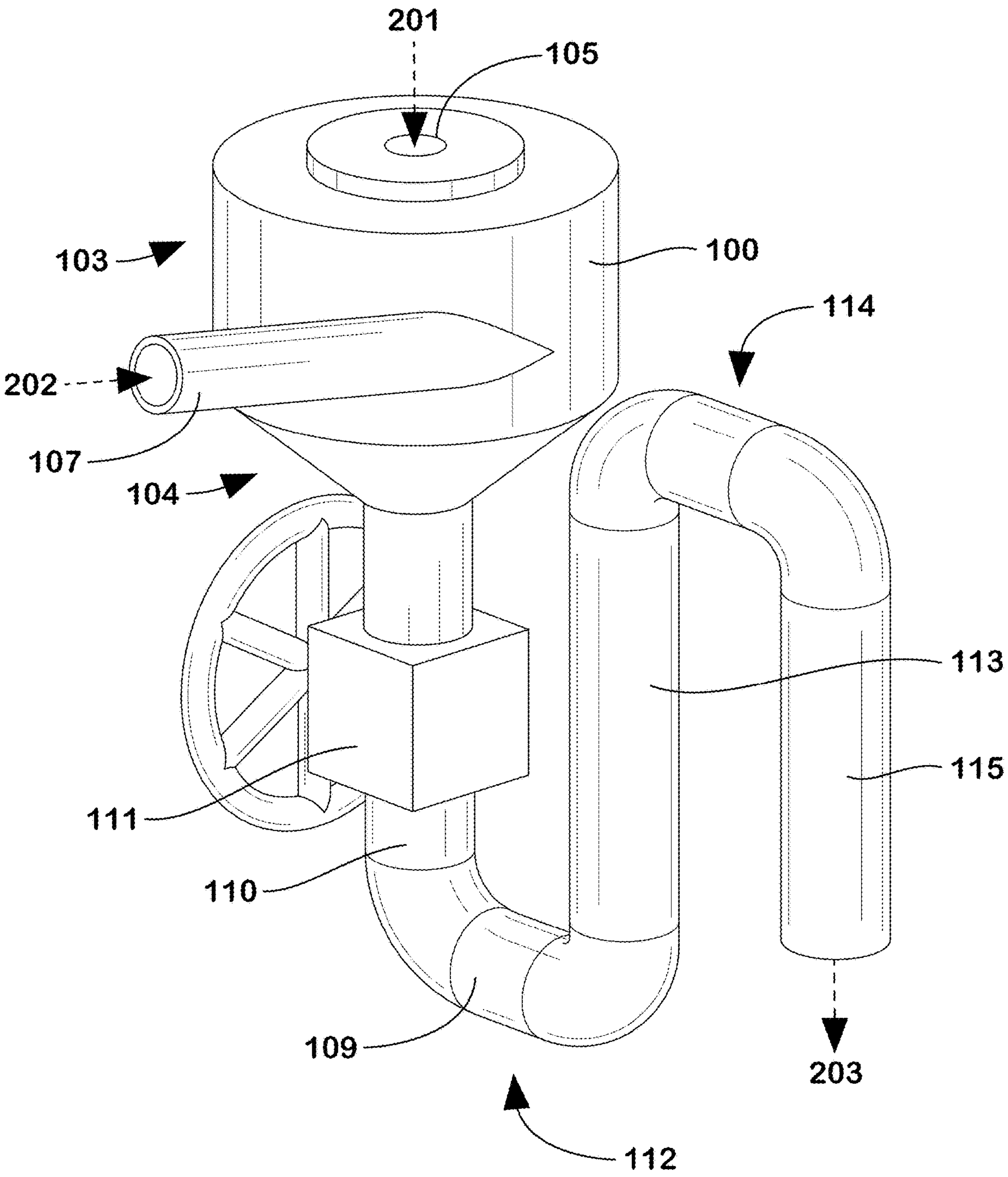
FIG. 1 shows a perspective view of the sand separation system with continuous siphoned sand disposal in accordance with a first illustrated embodiment.

For purposes of explanation and not limitation, details and descriptions of certain preferred embodiments are hereinafter provided such that one having ordinary skill in the art may be enabled to make and use the invention. These details and descriptions are representative only of certain preferred embodiments, however, a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, reference numbers are provided in the drawings for illustrating certain features of embodiments. Where distinct figures of the drawings utilize a shared reference number, it can be appreciated that the feature corresponding to the shared reference number is the same or similar, perhaps observed from a different view, or observed with respect to a different embodiment deploying the same or similar feature.

For purposes herein, the term "coupled" means that the coupled components, articles, or systems are separable from each other.

The term "attached" means that the attached components, articles, or systems are not separable from each other.

The term "integrated" means that the integrated components, articles, or systems refer to features which together form a continuous body.

The term "joined" may be taken to mean "coupled," "attached," "integrated," or some combination thereof.

Unless explicitly defined herein, terms are to be construed in accordance with the plain and ordinary meaning as would be appreciated by one having skill in the art.

GENERAL DESCRIPTION OF EMBODIMENTS

In some embodiments, the separation system with continuous sand disposal comprises a sand catching vessel and a siphon conduit. In some embodiments the separation system may further comprise a control valve, a water inlet, an internal sand conduit, or some combination thereof.

Sand Catching Vessel

The sand catching vessel comprises a vessel enclosure, a sand inlet, and a disposal port. The vessel enclosure is the interior surface of the sand catching vessel, and it may be bounded by an upper end, a lower end, and a lateral wall which spans the distance between the upper end and lower end. The sand inlet is an opening through the vessel enclosure where a sand stream may enter the vessel enclosure. In some embodiments, there is a cyclonic separator upstream of the sand inlet. The sand stream exiting a cyclonic separator may be fed into the sand catching vessel.

The sand catching vessel has a disposal port which is an opening through the vessel enclosure where the disposal stream exits the vessel enclosure. In some embodiments, the disposal port is disposed towards the lower end of the vessel enclosure. In some embodiments, the disposal port is disposed through the horizontal center of the vessel enclosure. After exiting the disposal port, the sand stream is conveyed to the siphon conduit.

In some embodiments, the sand catching vessel further comprises an internal sand conduit. The internal sand conduit may be a pipe which routes the sand stream into a specific area of the vessel enclosure. The sand conduit may be joined to the sand inlet such that the sand stream is conveyed through the internal sand conduit into the vessel enclosure. The internal sand conduit may further comprise an internal sand segment. The internal sand segment may be the downstream end of the internal sand conduit and it may be oriented downward at an angle below horizontal.

Siphon Conduit

In some embodiments, the siphon conduit may comprise a first downcomer segment, a first riser segment, and a second downcomer segment. The first downcomer segment may be joined to the disposal port. The first riser segment may be joined to the downcomer segment at a low point which is downstream of the first downcomer segment. In some embodiments, the low point may be disposed at an elevation below the disposal port.

The second downcomer segment may be joined to the first riser segment at a high point which is downstream of the first riser segment. In some embodiments, the high point may be disposed at an elevation above the liquid level within the vessel enclosure.

The second downcomer segment may have a downstream end. In some embodiments, the downstream end of the second downcomer segment may be disposed at an elevation below the liquid level within the vessel enclosure.

Control Valve

In some embodiments, the separator system may further comprise a control valve. The control valve may be disposed on the siphon conduit. In some embodiments, the control valve may be disposed on the first downcomer segment of the siphon conduit. In some embodiments, the control valve may be configured to control the flow rate of the disposal stream. In some embodiments, the control valve may be configured to control the flow rate of the disposal stream based on the pressure experienced by the disposal stream. In some embodiments, the control valve may be manually operated. In some embodiments, the control valve may be motor operated.

Water Inlet

In some embodiments, the separator system may further comprise a water inlet. In some embodiments, the water inlet may have a water conduit upstream of the water inlet. During the course of operation, a water stream may be injected into the vessel enclosure to help convey the disposal stream out of the vessel enclosure. In some embodiments, the water conduit and water inlet may be oriented tangentially to the lateral wall of the vessel enclosure. In some embodiments, the water conduit may be oriented downward, below horizontal. The angle of the water conduit may be between 0-degrees, horizontal, and 180-degrees vertical.

Streams

Typically, the sand stream entering the sand catching vessel will be some mixture of oil, gas, water, sand, or other mining/drilling constituents. The disposal stream exiting the primary separator is intended to be primarily sand, however as with most separation technology, the separation process is not 100% effective. The disposal stream may still contain trace amounts of oil, gas, water or some combination thereof, in addition to sand.

Primary Embodiment

FIG. 1 depicts a perspective view of a first illustrated embodiment of a separation system with continuous siphoned sand disposal. The sand catching vessel (100) receives a sand stream (201) through the sand inlet (105). The sand falls downward and is conveyed into the siphon conduit (109). A control valve (111) controls the flow rate of the disposal stream (203). This embodiment has a water conduit (107) which is configured to convey a water stream (202) into the sand catching vessel (100).

Figure 2:
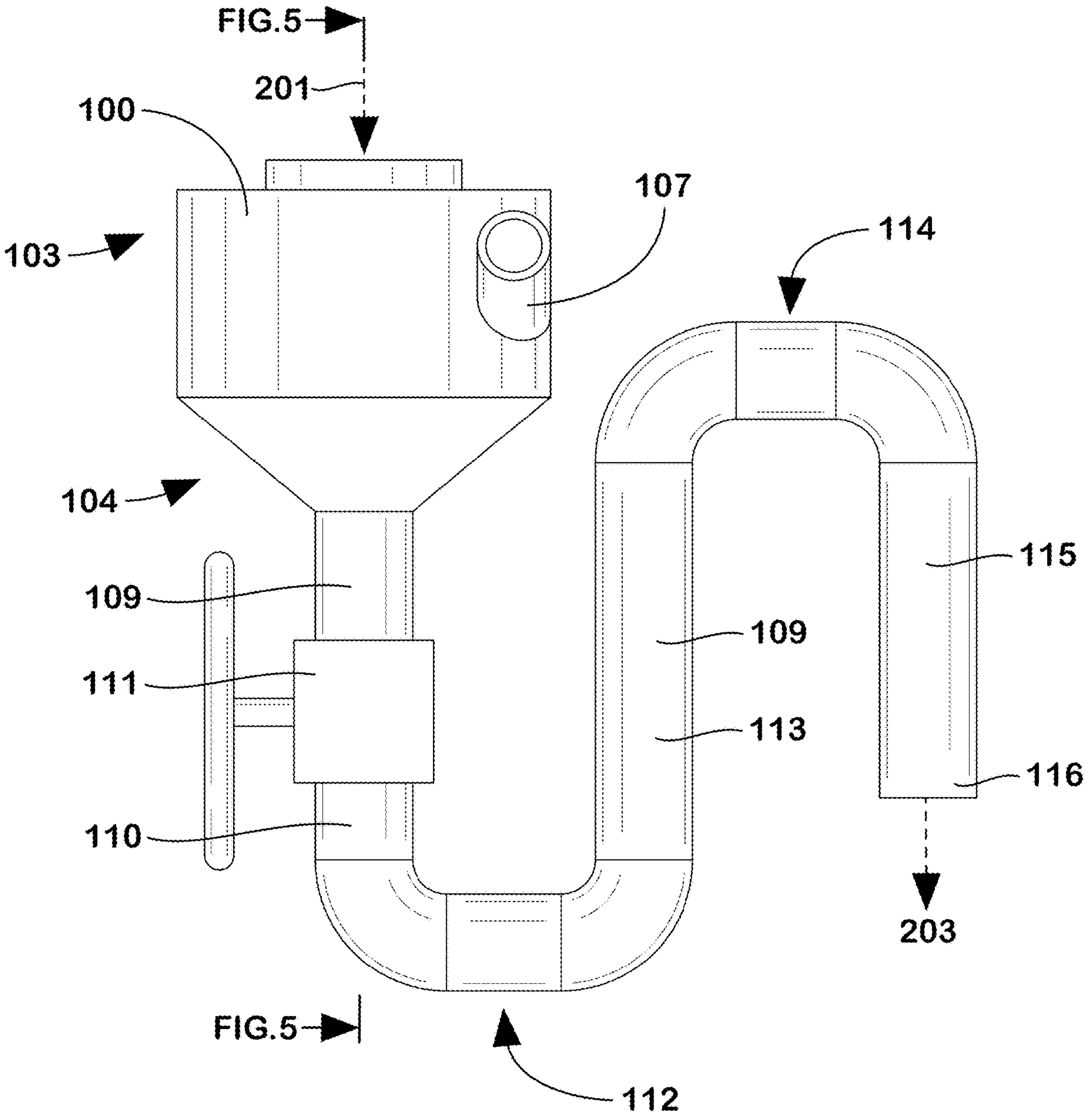
FIG. 2 shows a side view of the sand separation system with continuous siphoned sand disposal in accordance with a first illustrated embodiment.
Figure 3:
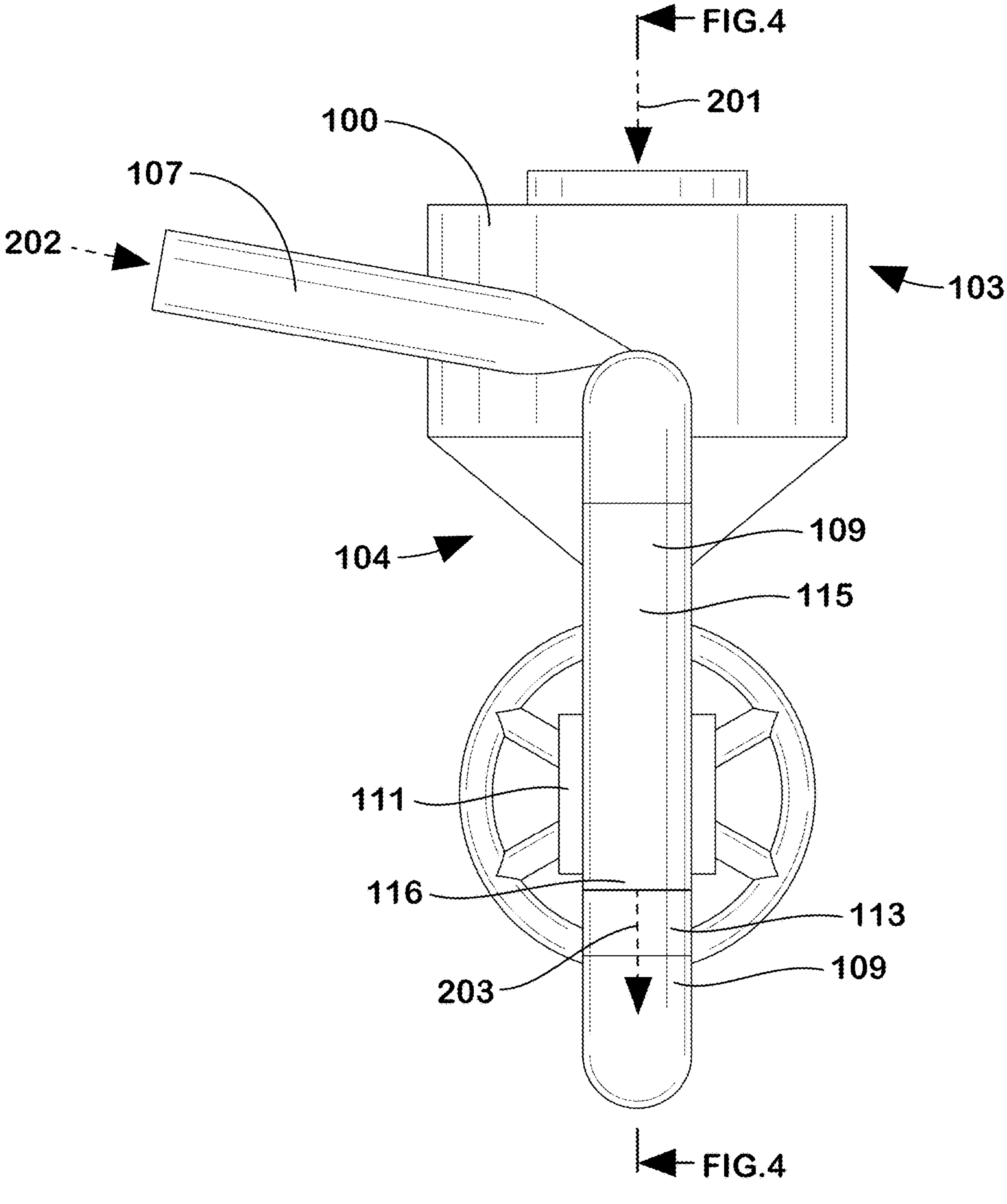
FIG. 3 shows a back view of the sand separation system with continuous siphoned sand disposal in accordance with a first illustrated embodiment.

FIG. 2 and FIG. 3 depict side and back profile views of the first embodiment of the sand separator. The sand catching vessel has an upper end (103) and a lower end (104). The siphoning conduit (109) has a first downcomer segment (110) followed by a first riser segment (113) followed by a second downcomer segment (115). In FIG. 2 the downstream end (116) of the second downcomer segment is identified.

Figure 4:
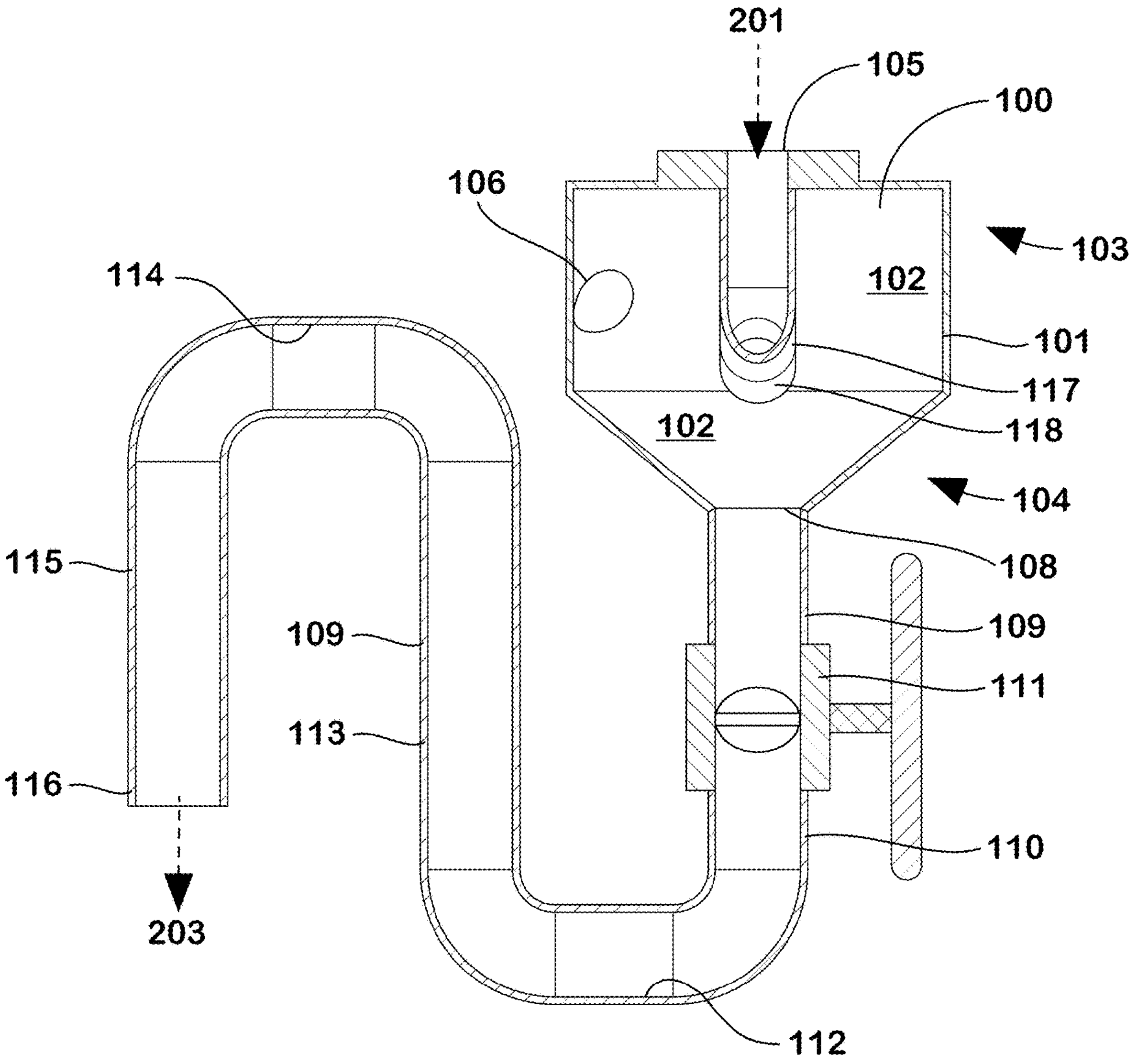
FIG. 4 shows a side sectional view of the sand separation system with continuous siphoned sand disposal in accordance with a first illustrated embodiment.
Figure 5:
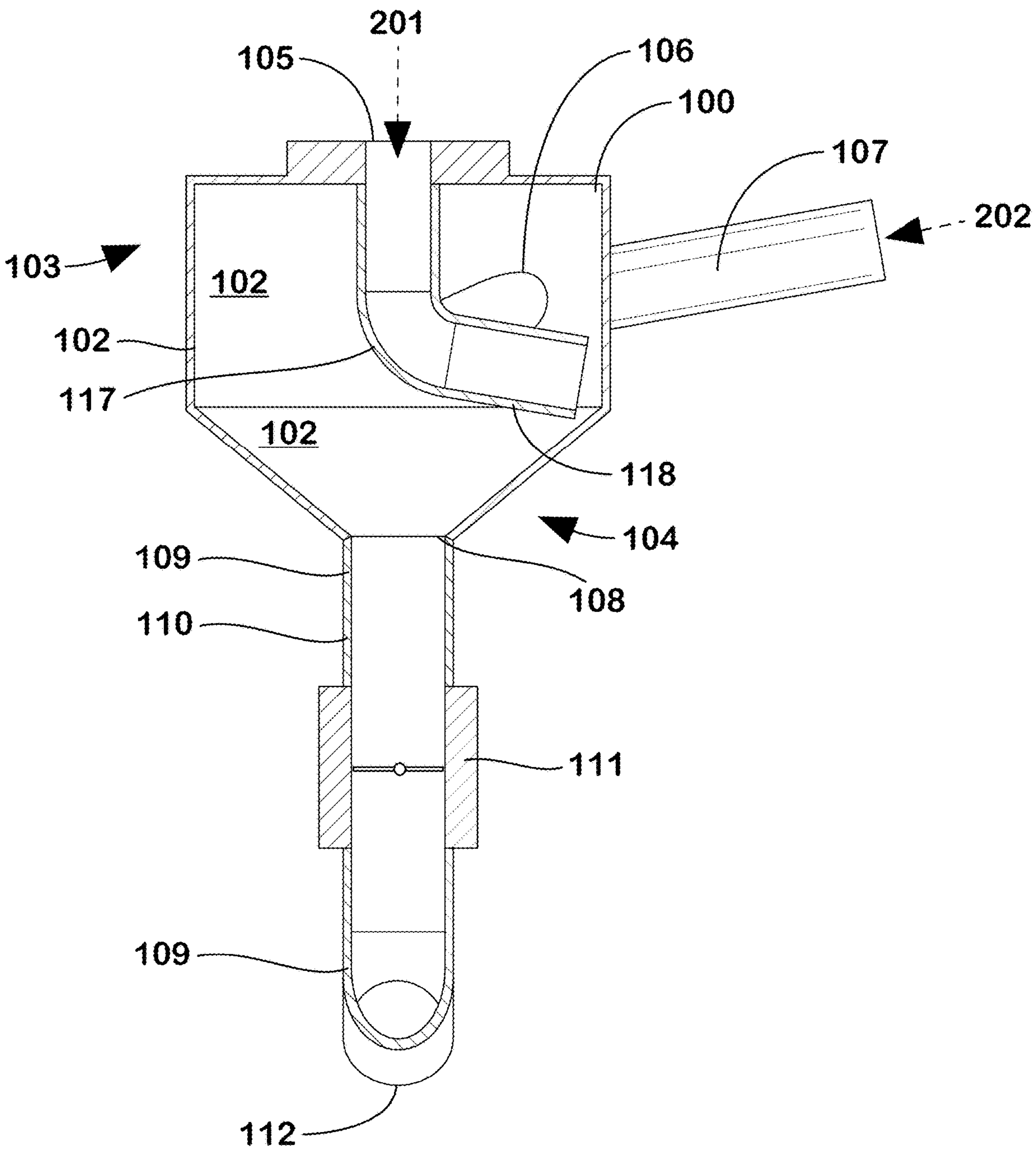
FIG. 5 shows a front sectional view of the sand separation system with continuous siphoned sand disposal in accordance with a first illustrated embodiment.

FIG. 4 and FIG. 5 show a side and front sectional views of the first illustrated embodiment of the separation system. The vessel enclosure (101) is bounded by an upper end (103), a lower end (104), and a lateral wall (102). The sand inlet (105) is disposed through the upper end of the vessel enclosure. The disposal port (108) is disposed through the lower end of the vessel enclosure. The water inlet (106) is disposed through the lateral wall (102) of the vessel enclosure. The water conduit (107) and water inlet are oriented downward from horizontal and tangentially to the lateral wall of the vessel enclosure. Between the first downcomer segment (110) and the first riser segment (113) is a low point (112) in the siphoning conduit. Between the first riser segment and the second downcomer segment (115) is a high point (114) in the siphoning conduit.

FIG. 4 and FIG. 5 show an internal sand conduit (117) joined around to the sand inlet (105) configured to convey the sand stream (201) further into the vessel enclosure (101). An internal sand segment (118) of the internal sand conduit is oriented downward below horizontal.

Manufacturing

While various details, features, and combinations are described in the illustrated embodiments, one having skill in the art will appreciate a myriad of possible alternative combinations and arrangements of the features disclosed herein. As such, the descriptions are intended to be enabling only, and non-limiting. Instead, the spirit and scope of the invention is set forth in the appended claims.

| Feature List | |
|---|---|
| Sand Catching Vessel | (100) |
| Vessel Enclosure | (101) |
| Lateral Wall | (102) |
| Upper End | (103) |
| Lower End | (104) |
| Sand Inlet | (105) |
| Water Inlet | (106) |
| Water Conduit | (107) |
| Disposal Port | (108) |
| Siphoning Conduit | (109) |
| First Downcomer Segment | (110) |
| Control Valve | (111) |
| Low Point | (112) |
| First Riser Segment | (113) |
| High Point | (114) |
| Second Downcomer Segment | (115) |
| Second Downcomer Downstream End | (116) |
| Internal Sand Conduit | (117) |
| Internal Sand Segment | (118) |
| Sand Stream | (201) |
| Water Stream | (202) |
| Disposal Stream | (203) |

What is claimed is:

1. A sand catching vessel system, the sand catching vessel system comprising a sand catching vessel and a siphoning conduit, a. The sand catching vessel comprising a vessel enclosure, a sand inlet, and a disposal port; the vessel enclosure being disposed within the sand catching vessel, the sand catching vessel having an upper end, a lower end, and a lateral wall, the sand inlet being an opening through the vessel enclosure where a sand stream enters the vessel enclosure, the disposal port being an opening through the vessel enclosure where a disposal stream exits the vessel enclosure, the disposal port being disposed towards the lower end of the vessel enclosure, the disposal stream exiting the vessel enclosure being conveyed into the siphoning conduit, b. The siphoning conduit comprising a first downcomer segment, a first riser segment, and a second downcomer segment, the first downcomer segment being joined to the disposal port, the first riser segment being joined to the first downcomer segment downstream of the first downcomer segment, a low point being disposed between first downcomer segment and the first riser segment, the second downcomer segment being joined to the first riser segment downstream of the first riser segment, a high point being disposed between first riser segment and the second downcomer segment, the disposal stream exiting the downstream end of the second downcomer segment.

2. The sand catching vessel system of claim 1, further comprising:

a. A control valve, the control valve disposed on the siphoning conduit.

3. The sand catching vessel system of claim 2, wherein:

a. The control valve is disposed on the first downcomer segment of the siphoning conduit.

4. The sand catching vessel system of claim 2, wherein:

a. The control valve is hand operated.

5. The sand catching vessel system of claim 2, wherein:

a. The control valve is motor operated.

6. The sand catching vessel system of claim 1, further comprising:

a. A water inlet, the water inlet being an opening through the vessel enclosure where a water stream enters the sand catching vessel.

7. The sand catching vessel system of claim 6, further comprising:

a. A water conduit, the water conduit conveying water to the water inlet, the water conduit and water inlet are oriented tangentially to the lateral wall of the vessel enclosure.

8. The sand catching vessel system of claim 7, wherein:

a. The angle of the water conduit is oriented at a downward angle below horizontal.

9. The sand catching vessel system of claim 6, further comprising:

a. An internal sand conduit, the internal sand conduit being joined to the sand inlet.

10. The sand catching vessel system of claim 9, further comprising:

a. An internal sand segment, the internal sand segment being the downstream end of the internal sand conduit, the internal sand segment being oriented downward at an angle below horizontal.

* * * * *